(12) United States Patent
Dandamudi et al.

(10) Patent No.: US 11,138,273 B2
(45) Date of Patent: Oct. 5, 2021

(54) ONBOARDING SERVICES

(71) Applicant: INTERNATIONAL BUSINESS MACHINES CORPORATION, Armonk, NY (US)

(72) Inventors: Sunil Dandamudi, Durham, NC (US); Stephanie A. Fetzer, Wilmington, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 917 days.

(21) Appl. No.: 15/677,130

(22) Filed: Aug. 15, 2017

(65) Prior Publication Data

US 2019/0057087 A1 Feb. 21, 2019

(51) Int. Cl.
*G06F 16/00* (2019.01)
*G06F 16/93* (2019.01)
*G06F 40/20* (2020.01)
*G06Q 10/06* (2012.01)

(52) U.S. Cl.
CPC .............. *G06F 16/93* (2019.01); *G06F 40/20* (2020.01); *G06Q 10/06* (2013.01)

(58) Field of Classification Search
None
See application file for complete search history.

(56) References Cited

U.S. PATENT DOCUMENTS

| 7,647,500 | B2 | 1/2010 | Machiraju et al. |
| 2012/0066388 | A1* | 3/2012 | Margo ................... G06Q 10/06 709/226 |
| 2013/0204884 | A1 | 8/2013 | Stewart et al. |
| 2013/0318426 | A1* | 11/2013 | Shu ..................... G06K 9/00469 715/226 |
| 2014/0095249 | A1 | 4/2014 | Tarakad et al. |
| 2015/0317129 | A1 | 11/2015 | Falk et al. |
| 2018/0012268 | A1* | 1/2018 | Simantov ............... G06Q 30/04 |
| 2019/0028349 | A1* | 1/2019 | Chen ................... H04L 41/0866 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

*Primary Examiner* — Anhtai V Tran
(74) *Attorney, Agent, or Firm* — Stephanie Carusillo; Hye Jin Lucy Song; Heslin Rothenberg Farley & Mesiti PC

(57) ABSTRACT

Methods, computer program products, and systems are presented. The methods include, for instance: generating an onboarding document specifying an interaction event based on a document specifying the interaction event and an implementation guide between a pair of partners. The interaction event is cognitively analyzed for accuracy and the implementation guide is updated based on reinforced machine learning for optimized onboarding of following interactions.

20 Claims, 8 Drawing Sheets

400

```
L401:   ISA*00*  *00*   *ZZ*PROXIMA  *ZZ*KP65410
                   *160926*1415*U*00401*000000009*0*P*:~
L402:   GS*IN*PROXIMA*KP65410*20160926*1415*4*X*004010~
L403:   ST*810*0004~
L404:   BIG*121212*12121*342*12121221~
L405:   CUR*SE*USD~
L406:   N1*ST*Doe~
L407:   N3*1234 Main Street~
L408:   N4*Yourtown*IL*56789*USD~
L409:   IT1*1*20*LB*12.24*PE~
L410:   PID*F*GEN***Product1 Name ~
L411:   IT1*2*2*EA*29.99*PE~
L412:   PID*F*GEN*** Product2 Name ~
L413:   IT1*3*6*EA*25.99*PE~
        . . .
```

FIG. 4

```
600
     {
L601:    "BIG02":"12121",
L602:    "BIG01":"12-12-12",
L603:    "invoiceLines":
         [
           {
L604:        "IT101": "1",
             . . .
L605:        "IT107": "12121221",
             . . .
           }
         ],
L606:    "BIG04":"12121221",
         . . .
     }
```

650

Invoice Number:  BIG02 (value – 12121, Ranking 1)
                              BIG03 (value – 342, Ranking 2)
                              . . .

FIG. 6

ONBOARDING SERVICES

TECHNICAL FIELD

The present disclosure relates to business-to-business (B2B) technology, and more particularly to methods, computer program products, and systems for optimizing supply chain management performances.

BACKGROUND

In conventional electronic data interchange (EDI) in B2B environments, each business entity utilizes custom implementation configurations and business rules in interpreting transaction documents. Consequently, an onboarding process for a new trading partner entails applying the business rules used by the new trading partner to transaction documents manually, for each new trading partner.

SUMMARY

The shortcomings of the prior art are overcome, and additional advantages are provided, through the provision, in one aspect, of a method. The method for providing onboarding services for one or more user in an environment includes: obtaining, by one or more processor, a document from a user via a user device, wherein the document specifies one or more interactions between the user and one or more partner; identifying, by the one or more processor, one or more implementation guide applicable to the obtained document, wherein the implementation guide (i) is respective to each of the one or more partner and (ii) is utilized for interpreting documents; generating, by the one or more processor, an interaction event from the document according to one of the one or more implementation guide corresponding to a specific partner; and updating, by the one or more processor, the one or more implementation guide responsive to optimizing the interaction event by use of cognitive analysis and reinforced machine learning, such that the updated implementation guide is predicted to have a second level of accuracy for interpreting documents that is greater than a first level of accuracy associated with the first implementation guide.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 4 and 5 depict an exemplary supply chain document and an exemplary supply chain implementation guide applicable to the exemplary supply chain document, in accordance with one or more embodiments set forth herein;

FIG. 6 depicts an exemplary onboarding document and a result display by the onboarding performance engine, in accordance with one or more embodiments set forth herein;

DETAILED DESCRIPTION

Figure 1:
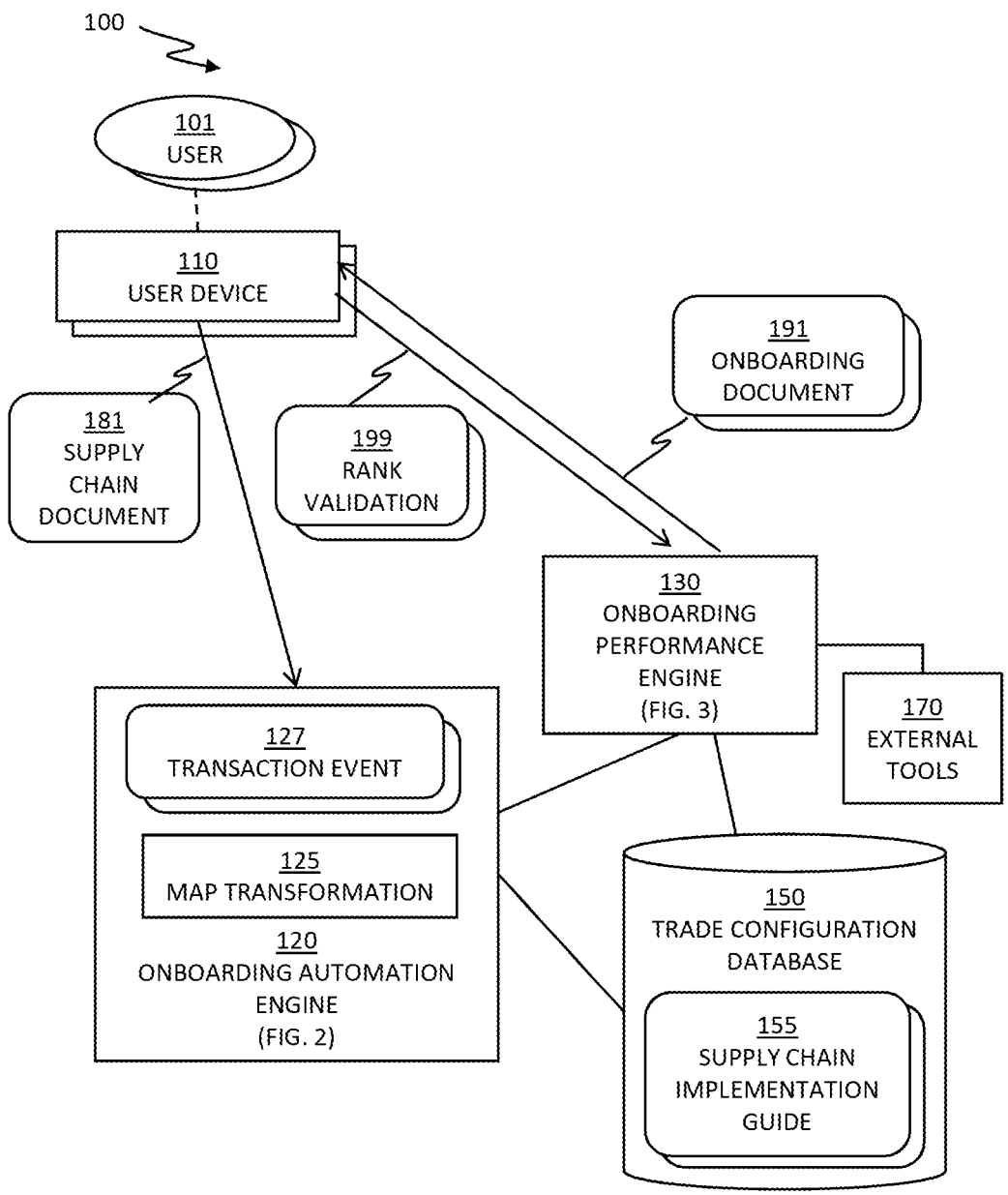
FIG. 1 depicts a system for optimizing onboarding performance by use of machine learning, in accordance with one or more embodiments set forth herein.

FIG. 1 depicts a system 100 for optimizing onboarding performance in transactions, in accordance with one or more embodiments set forth herein.

The system 100 provides an onboarding optimization service for a user 101 amongst many users in need of efficient and accurate onboarding services in order to adapt to a new business-to-business (B2B) environment with numerous business entities as trading partners. The system 100 includes a user device 110 for the user 101, an onboarding automation engine 120, an onboarding performance engine 130, and a trade configuration database 150. The user 101 represents a business entity participating in the B2B environment. By use of the system 100, the user 101 may receive suggestions based on machine learning, on how to map data fields meaningful to transactions such that efficiently and optimally completes the task of onboarding. Further the user 101 may select from the suggestions as presented, provide customary input for data field mappings, and/or train the system 100 by validating or invalidating the machine learning-based suggestions.

A supply chain implementation guide 155 is a collection of rules to locate data fields in a supply chain document 181. The supply chain document 181 may have a data field that is critical to a transaction but not represented in the supply chain implementation guide 155 nevertheless. In conventional supply chain management applications, a set of business rules are applied to resolve locations of the data fields that are not configured in the supply chain implementation guide 155. The trade configuration database 150 stores a plurality of supply chain implementation guides, which set forth data formats respective to business entities in interpreting supply chain documents of another business entity in the B2B environment. The trade configuration database 150 may be a cloud-based database service, referred to as a Database-as-a-service (DBaaS) that is accessible by all business entities in the B2B environment. Examples of the trade configuration database 150 may include, but are not limited to, Mongo DB, etc.

The user 101 uploads the supply chain document 181 to the onboarding automation engine 120, by use of the user device 110. The supply chain document 181 includes a plurality of data fields describing various aspects of one or more transaction between the user 101 and one or more trading partners. The supply chain document 181 is written in a standard syntax. Examples of available supply chain document standard syntaxes may include, but are not limited to, variations of Electronic Data Interchange (EDI) such as Accredited Standards Committee X12 Electronic Data Interchange (ASC X12 EDI), United Nations/Electronic Data Interchange for Administration, Commerce and Transport (UN/EDIFACT), etc. Presently available supply chain document standards have numerous rules that may be interpreted differently from one business entity to another business entity. An example of the supply chain document 181 is presented in FIG. 4 and corresponding description.

The user device 110 communicates with the onboarding automation engine 120 by use of communication service application programming interfaces (API). Examples of available communication service API may include, but are not limited to, a RESTful service based on Representation State Transfer (REST), which is commonly used in building web services.

The onboarding automation engine 120 obtains and processes the supply chain document 181 for onboarding. The onboarding automation engine 120 includes a map transformation process 125, which interprets the supply chain document 181 according to each of applicable supply chain implementation guides. The onboarding automation engine 120 may generate a supply chain implementation guide for a new business entity as appearing in the supply chain document for the first time. Subsequent to mapping, the onboarding automation engine 120 generates a transaction event 127 from the supply chain document 181, based on the supply chain implementation guide 155 applicable to the supply chain document 181. In this specification, the transaction event 127 corresponds to an onboarding document. In certain embodiments of the present invention, the transaction event 127 is generated as a JavaScript Object Notation (JSON) event for further processing by the onboarding performance engine 130 and other analytical purposes. The onboarding automation engine 120 implements some aspects of a supply chain visibility solution, by which the user 101 may capture and manage each supply chain implementation guide for respective trading partners and develop respective maps for transforming the supply chain document into a canonical form. Details on operations of the onboarding automation engine 120 are presented in FIG. 2 and corresponding description. An example of the supply chain implementation guide 155 is presented in FIG. 5 and corresponding description. An example of the transaction event 127 is presented in FIG. 6 and corresponding description.

The onboarding performance engine 130 evaluates the transaction event 127 by use of external tools 170 and presents a onboarding document 191 as ranked and scored to the user 101. The onboarding performance engine 130 may receive a rank validation 199 on ranks of the onboarding document 191, and optimizes the supply chain implementation guide 155 responsive to the ranks and scores in the onboarding document 191 and/or the rank validation 199. Examples of the external tools 170 may include, but are not limited to, a machine learning process, IBM Watson Rank and Retrieve, etc. Details on operations of the onboarding performance engine 130 are presented in FIG. 3 and corresponding description.

Certain embodiments of the present invention may improve functionalities of IBM Supply Chain Visibility solution, particularly the components of IBM Business Transaction Intelligence (BTI), IBM Transformation eXtender (ITX), etc. In certain embodiments of the present invention, the onboarding performance engine 130 may be implemented on top of an infrastructure performance monitoring (IPM) tool on a cloud, according to software-as-a-service (SaaS) architecture.

FIG. 1 illustrates aspects of one embodiment wherein the B2B environment is directed to sales transactions and supply chain documents describing transactions regarding supply chain between two trading partners. Certain embodiments of the present invention may be utilized for any type of interactions involving a plurality of entities to an interaction. Accordingly, the term "interaction" may be interchangeably used in place for the term "transaction" in describing numerous embodiments of the present invention. Any type of documents describing the interaction may have a plurality of data fields, and may be interpreted based on a corresponding implementation guide configuring data fields of a document. In this specification, terms "supply chain document 181" and "supply chain implementation guide 155" illustratively represent a type of a document and a guide configuring data fields of the document, respectively. Accordingly, the term "document" may be interchangeably used in place for the term "supply chain document" in describing numerous embodiments of the present invention. Similarly, the term "implementation guide" may be interchangeably used in place for the term "supply chain implementation guide" in describing numerous embodiments of the present invention. Similarly, as the term "trade configuration database" illustratively represents a configuration database for implementation guides of any interactions, the term "configuration database" may be interchangeably used in place for the term "trade configuration database" in describing numerous embodiments of the present invention. Also, the illustrative term "trading partner" may be interchangeably used with any terms indicating a counterpart in an interested interaction, including, but not limited to, a "second user", a "partner", etc.

Figure 2:
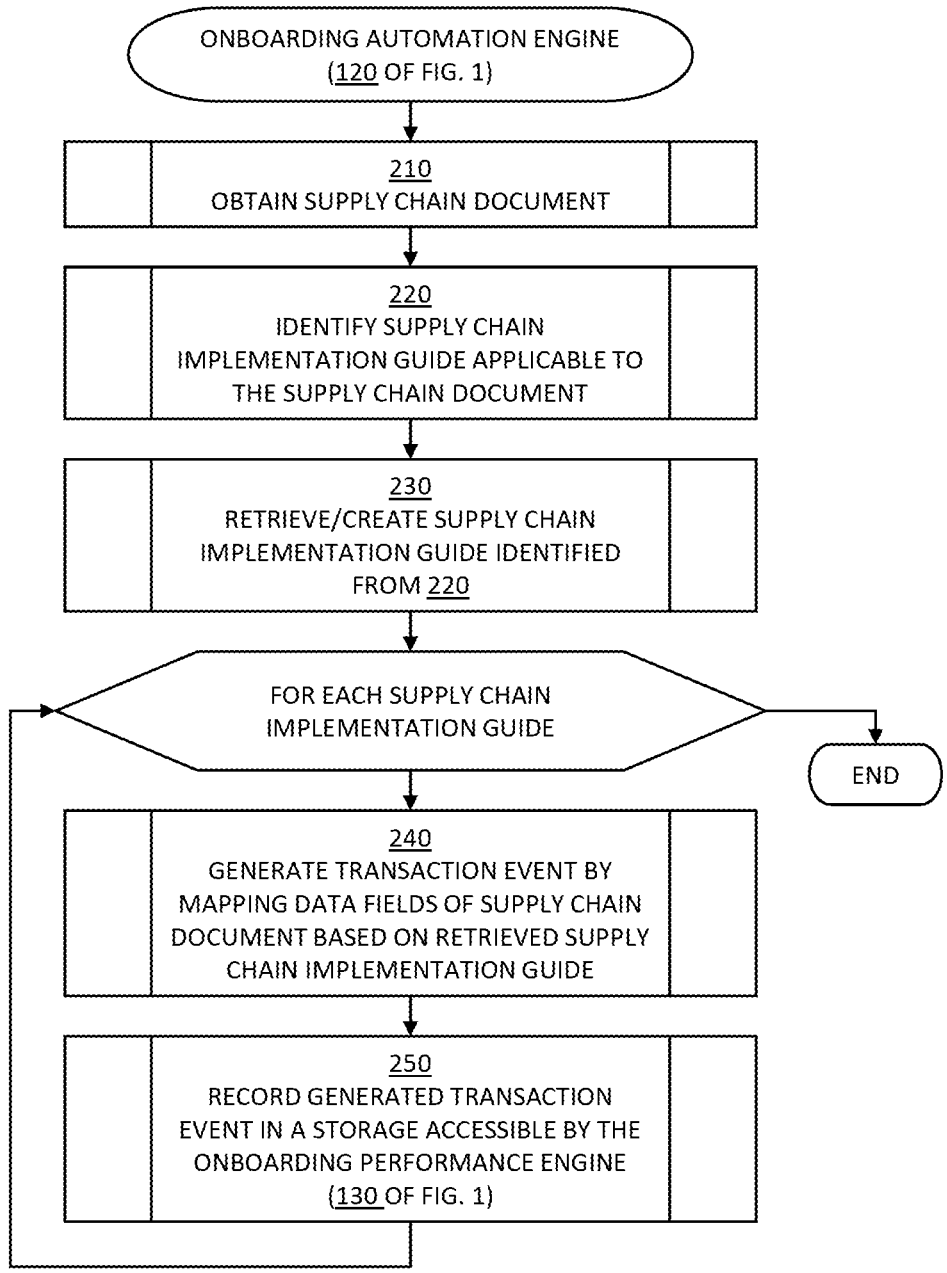
FIG. 2 depicts a flowchart of operations performed by the onboarding automation engine, in accordance with one or more embodiments set forth herein.

FIG. 2 depicts a flowchart of operations performed by the onboarding automation engine 120 of FIG. 1, in accordance with one or more embodiments set forth herein.

In block 210, the onboarding automation engine 120 obtains a supply chain document as uploaded by the user on the user device. Then the onboarding automation engine 120 proceeds with block 220.

In block 220, the onboarding automation engine 120 identifies all supply chain implementation guide applicable to the supply chain document obtained from block 210. In one embodiment of the present invention, the onboarding automation engine 120 scans the obtained the supply chain document and extracts all business entity names represented in the supply chain document. The onboarding automation engine 120 determines respective supply chain implementation guides corresponding to each business entity as being applicable to the supply chain document for onboarding. Then the onboarding automation engine 120 proceeds with block 230.

In block 230, the onboarding automation engine 120 retrieves, from the trade configuration database 150, all supply chain implementation guides as being identified as applicable to the supply chain document. If no supply chain implementation guide corresponding to a certain trading partner exists in the trade configuration database 150, then the onboarding automation engine 120 may create a new supply chain implementation guide for the certain trading partner for the first time based on average data field requirements of similar transactions, such that the supply chain document including a new trading partner may be automatically processed as well. Then the onboarding automation engine 120 proceeds with block 240.

The onboarding automation engine 120 performs blocks 240 and 250 as a unit for all supply chain implementation guides applicable for the supply chain document, which had been retrieved from block 230.

In block 240, the onboarding automation engine 120 maps data fields of the supply chain document into a canonical form based on a current supply chain implementation guide, as offered by a trading partner. The term "map" is used because often the location of a data field within the supply chain document may be different from the configured locations for the same data field in the supply chain implementation guide, and in order to identify a certain data field into a canonical form, the onboarding automation engine 120 needs to identify which data field is respectively located in the supply chain document and the supply chain implementation guide. Based on the canonical form of data of the supply chain document, the onboarding automation engine 120 generates a transaction event between the user and the trading partner, having the data by the user from the supply chain document in a format understandable for the trading partner. Examples of the supply chain document and of the supply chain implementation guide are presented in FIGS. 4 and 5, and corresponding descriptions. Then the onboarding automation engine 120 proceeds with block 250.

In block 250, the onboarding automation engine 120 records the transaction event generated in block 240 in a storage accessible by both the onboarding automation engine 120 and the onboarding performance engine 130 such that the onboarding performance engine 130 may further process the transaction event and optimize the current supply chain implementation guide. Examples of the storage may include, but are not limited to, a network file system (NFS) storage, etc. Then the onboarding automation engine 120 loops back to block 240 for a next supply chain implementation guide. If the onboarding automation engine 120 performed blocks 240 and 250 for all supply chain implementation guide retrieved from block 230, then the onboarding automation engine 120 terminates processing the supply chain document obtained in block 210.

Figure 3:
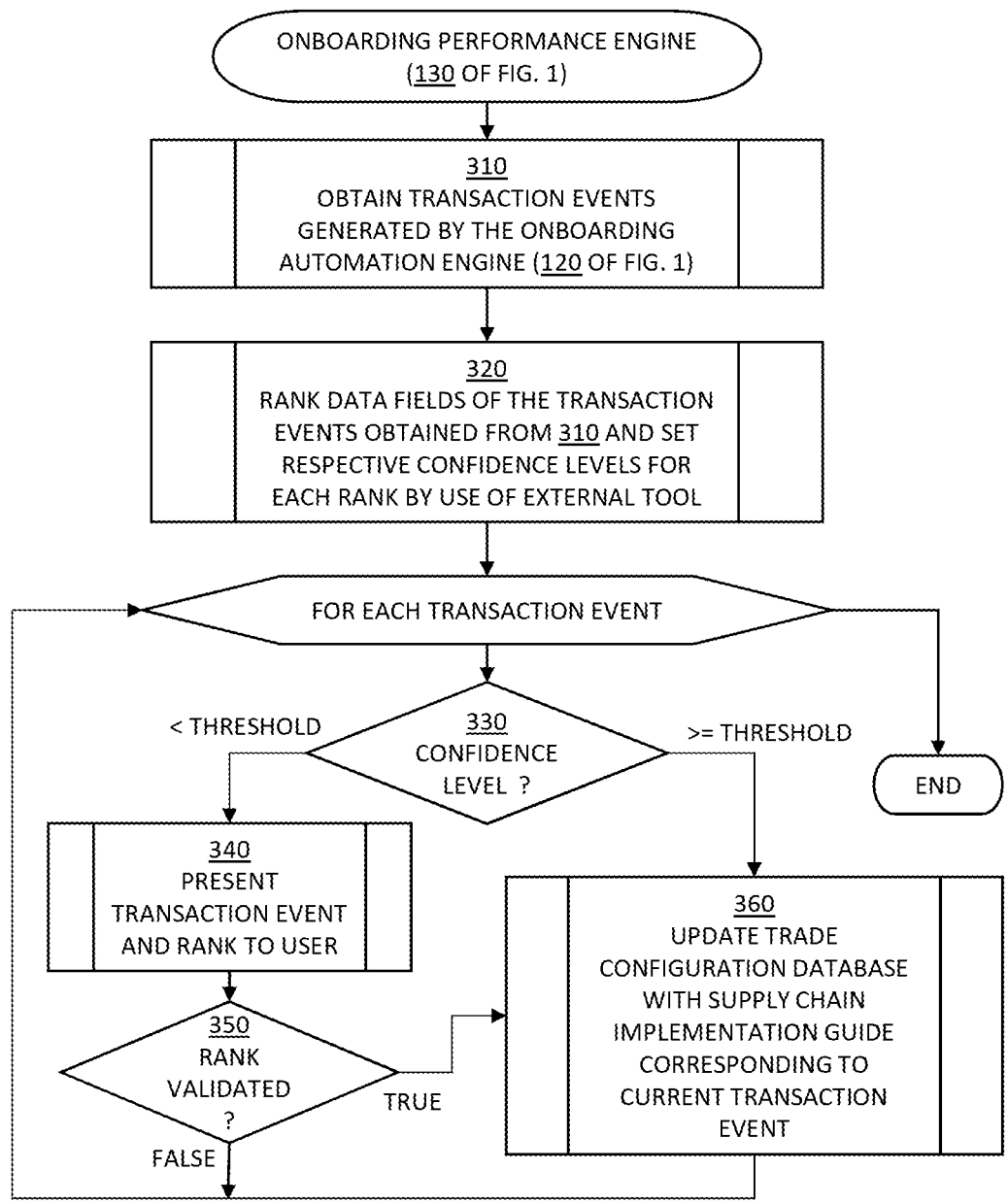
FIG. 3 depicts a flowchart of operations performed by the onboarding performance engine, in accordance with one or more embodiments set forth herein.

FIG. 3 depicts a flowchart of operations performed by the onboarding performance engine 130 of FIG. 1, in accordance with one or more embodiments set forth herein.

In block 310, the onboarding performance engine 130 obtains all the transaction events generated by the onboarding automation engine 120 in FIG. 2. Then the onboarding performance engine 130 proceeds with block 320.

In block 320, the onboarding performance engine 130 ranks data fields in the transaction events from block 310, and sets confidence levels respective to the rankings on the transaction events by use of an external tool for cognitive ranking of data. The data fields to rank may be preconfigured in the system 100. Then the onboarding performance engine 130 proceeds with block 330.

The onboarding performance engine 130 performs blocks 330 through 360 as a unit for all transaction events, as generated per each applicable supply chain implementation guide by the onboarding automation engine 120. The onboarding performance engine 130 terminates upon completion of performing blocks 330 through 360 for all transaction events generated by the onboarding automation engine 120, as described in FIG. 2.

In block 330, the onboarding performance engine 130 determines whether or not a confidence level set for the data field ranks of a current transaction event meets a predefined threshold value. If the onboarding performance engine 130 determines that the confidence level set for the data field ranks of the current transaction event is less than the threshold value, then the onboarding performance engine 130 proceeds with block 340. If the onboarding performance engine 130 determines that the confidence level set for the data field ranks of the current transaction event is greater than or equal to the threshold value, then the onboarding performance engine 130 proceeds with block 360.

In one embodiment of the present invention, the onboarding performance engine 130 has the threshold set at ninety percent (90%), indicating that the onboarding performance engine 130 would use the data field ranks of the transaction event with a ninety percent or higher probability of accuracy as a training data for the onboarding automation engine 120 by updating the trade configuration database 150. The onboarding performance engine 130 compares the confidence level set for the data field ranks of the current transaction event. The confidence level indicates how likely respectively ranked data field interpretations of the transaction event accurately interpret the supply chain document. As the data fields is interpreted according to the supply chain implementation guide that had been selected for a particular pair of trading partners, the ranks and confidence levels of the data fields also indicates respective effectiveness of supply chain implementation guides in interpreting the supply chain document between the pair of trading partners represented in the current transaction event.

In block 340, the onboarding performance engine 130 presents the data field ranks of the current transaction event to the user, as the confidence level of the rank is less than the threshold and the rank needs to be manually validated. In certain embodiments of the present invention, the onboarding performance engine 130 may be configured to present only the top ranked data field by default, instead of displaying data fields and corresponding ranks. In certain embodiments of the present invention, the onboarding performance engine 130 may be configured to display recommendations on the ranked data fields according to the supply chain implementation guide for the user to make an informed decision in validating the ranks, and/or a prompt to provide input in text or by checkboxes/buttons/menu items for a customized data field mapping instead of employing the ranked and scored data fields. Then the onboarding performance engine 130 proceeds with block 350.

In block 350, the onboarding performance engine 130 determines whether or not the user validated the rank and the current transaction event presented in block 340. If the onboarding performance engine 130 determines that the user had validated the rank and the current transaction event as presented, then the onboarding performance engine 130 proceeds with block 360. If the onboarding performance engine 130 determines that the user had not validated the presented rank for the current transaction event, then the onboarding performance engine 130 loops back to block 330 for a next transaction event.

In block 360, the onboarding performance engine 130 updates the supply chain implementation guide corresponding to the current transaction event in the trade configuration database 150, because the confidence level for the ranking satisfies the threshold or because the user validated the ranking from block 350. As the onboarding automation engine 120 utilizes the supply chain implementation guides in the trade configuration database 150 to create transaction events, or as examples in creating new supply chain implementation guides for new trading partners, the updated supply chain implementation guide operates as training data of the onboarding automation engine 120, while the onboarding performance engine 130 refines the training data by performing blocks 330 through 360. An external machine learning process may be invoked by the onboarding performance engine 130 and by the onboarding automation engine 120 in order to further optimize the supply chain implementation guide in the trade configuration database 150. Then the onboarding performance engine 130 loops back to block 330 for a next transaction event.

Figure 5:
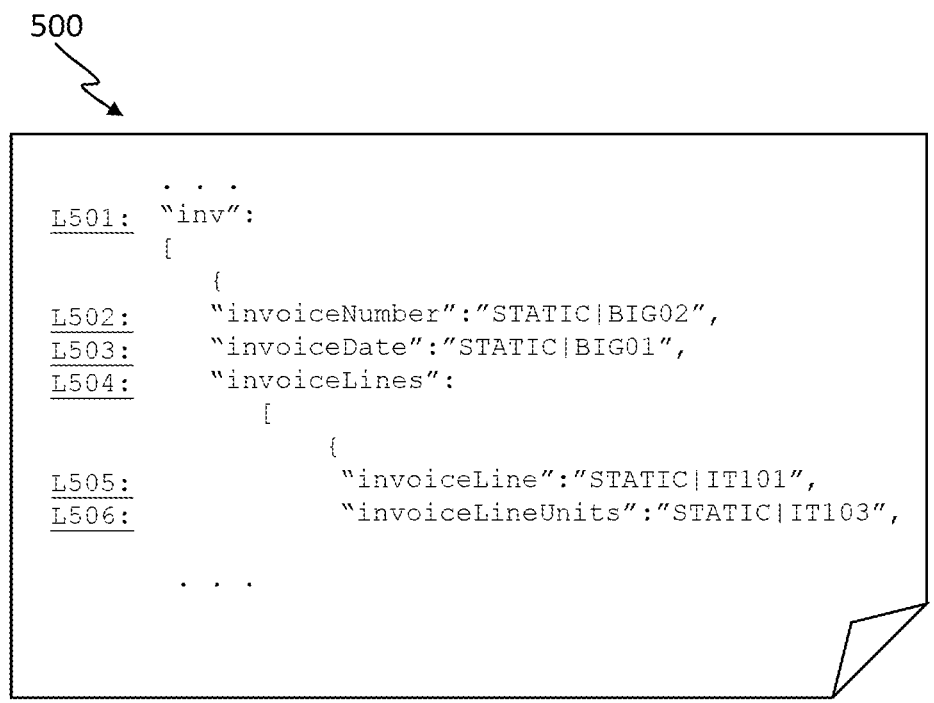

FIGS. 4 and 5 depict an exemplary supply chain document 400 and an exemplary supply chain implementation guide 500 applicable to the exemplary supply chain document 400, in accordance with one or more embodiments set forth herein.

The exemplary supply chain document 400 is a portion of a supply chain document for an actual transactions. Each numbered line L401 through L413 indicates a segment, and within the segment, data fields are separate by an asterisk (*). For example, in line L404, BIG segment has four (4) data fields, and each is referred to as BIG01, BIG02, BIG03, and BIG04 in the corresponding supply chain implementation guide 500, in JSON format. In line L404 of FIG. 4, BIG01, indicating a first data field in BIG segment, has a value "121212", and in line L503 of FIG. 5, BIG01 is specified as "invoiceDate". Similarly, in line L404 of FIG. 4, BIG02, indicating a second data field in BIG segment, has a value "12121", and in line L502 of FIG. 5, BIG02 is specified as "invoiceNumber".

In FIG. 5, the supply chain implementation guide 500 corresponding to the exemplary supply chain document 400, all data fields in the exemplary supply chain document 400 may be identified by a segment name and a data field location within the segment in a corresponding supply chain implementation guide. Further, wherein the same segment name appears more than once, as "IT1" of lines L409, L411, and L413, or "PID" of lines L410 and L412, the corresponding supply chain implementation guide distinguishes the respective appearances by including an order of appearance in the data field name, as shown in "IT101" of line L505 and "IT103" of line L506.

FIG. 6 depicts an exemplary onboarding document 600 and a result display 650 of block 340 of FIG. 3 by the onboarding performance engine 130, in accordance with one or more embodiments set forth herein.

The onboarding automation engine 120 generates the exemplary onboarding document 600 based on the exemplary supply chain document 400 of FIG. 4 and the exemplary supply chain implementation guide 500 of FIG. 5.

The result display 650 depicts what the onboarding performance engine 130 displays to the user 101 based on the onboarding document 600, responsive to ranking and scoring. For example, the external tool for ranking and confidence scoring ranks the data field BIG02 as a most likely data field to be an invoice number, based on the number of times the data field BIG02 appears in the onboarding document for all of the supply chain implementation guides. The onboarding performance engine 130 checks the confidence scores corresponding to the data field BIG02 and presents to the user the result display 650, provided that the confidence score is less than the threshold to update the training data in the trade configuration database 150 without manual validation. According to visibility configuration on the user device, the user 101 may or may not see the confidence score corresponding to the ranks for the data fields.

The result display 650 indicates, for the Invoice Number data field, and a data field BIG02, having a value "12121", is determined as the most likely data field to be the "Invoice Number", as represented in "Ranking 1". Another data field BIG03 with a value of "342" is a next likely candidate for the "Invoice Number" data field.

Certain embodiments of the present invention may offer various technical computing advantages, including contextual analysis on a plurality of supply chain documents and machine learning of past analyses as reinforced by a user feedback. A supply chain implementation guide, which configures respective locations of data fields in a supply chain document, may be automatically generated for onboarding of a new trading partner. Another supply chain implementation guide may previously generated and/or provided by another trading partner and is made available from the trade configuration database. According to the supply chain implementation guide, the data fields of the supply chain document are generated into a transaction event, specifying data fields and respective values necessary for a transaction amongst business entities. Certain embodiments of the present invention cognitively analyzes the transaction event in order to determine how accurately the data fields are interpreted. Some data fields in the transaction event are ranked and associated with a confidence level in deciding the rank of each data field. The transaction event is utilized to train a collection of supply chain implementation guides by machine learning and as reinforced by user feedback, which may validate and/or correct the data field interpretation for the transaction event. Accordingly, onboarding process for more new trading partners may be further optimized and more efficient as the training data in the trade configuration database show more patterns over time. By use of multithreading and/or multiprocessing, the onboarding automation and performance optimization service may be concurrently rendered for any number of trading partners in the serviced environment. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The onboarding automation and performance optimization service may be provided for subscribed business entities in need from any location in the world.

Figure 7:
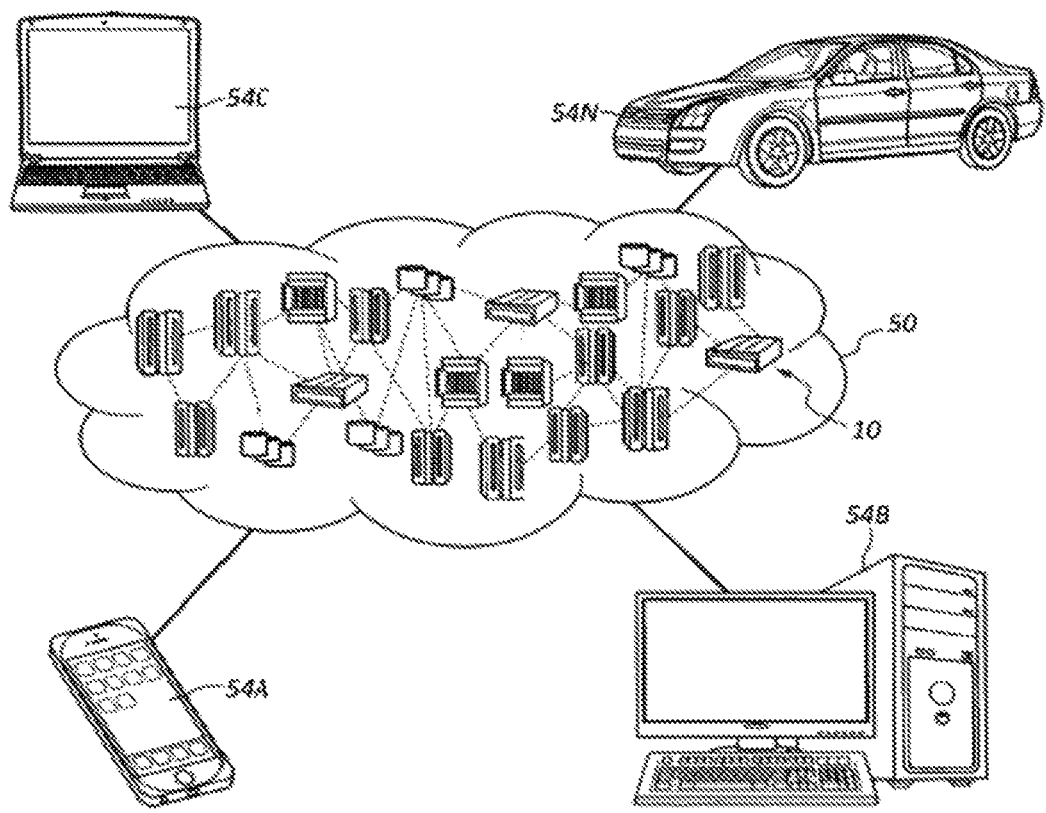
FIG. 7 depicts a cloud computing environment according to an embodiment of the present invention.
Figure 8:
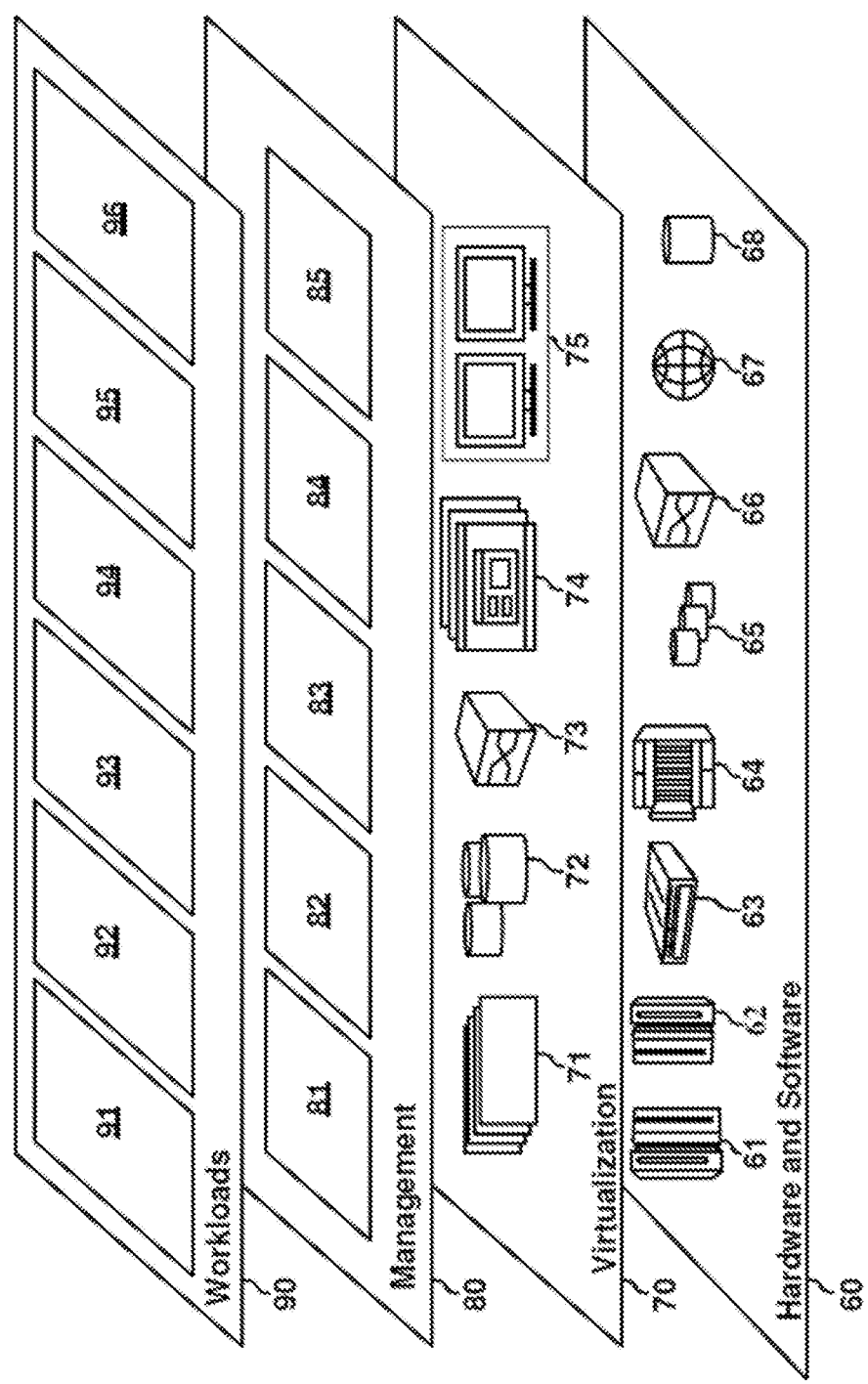
FIG. 8 depicts abstraction model layers according to an embodiment of the present invention.

FIGS. 7-8 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that cloud computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and processing components for the onboarding services as provided by the onboarding automation engine and the onboarding performance engine 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for providing onboarding services for one or more user in an environment, comprising:
    obtaining, by one or more processor, a document from a user via a user device, wherein the document specifies one or more interactions between the user and one or more partner, wherein the document includes one or more data field having a respective value;
    identifying, by the one or more processor, one or more implementation guide applicable to the document from the obtaining, wherein each of the one or more implementation guide (i) is respective to each of the one or more partner and (ii) is utilized for interpreting documents;
    generating, by the one or more processor, an interaction event from the document according to one of the one or more implementation guide corresponding to a partner amongst the one or more partner, wherein each value of the one or more data field in the document specifies an aspect of the interaction event between the user and the partner; and
    updating, by the one or more processor, the one or more implementation guide responsive to optimizing the interaction event by use of cognitive analysis and reinforced machine learning, such that an updated implementation guide resulting from the updating is predicted to have a second level of accuracy for interpreting documents between the user and the partner that is greater than a first level of accuracy associated with a first implementation guide, the updating comprising:
        determining, by use of a cognitive analysis tool, a rank for a data field in the one or more data field in the interaction event, wherein the rank indicates how probable the data field amongst all data fields in the interaction event would represent a feature of the interaction event;
        associating, by use of the cognitive analysis tool, a confidence level to the determined rank for the data field;
        ascertaining that the confidence level associated with the rank in combination with a user validation for the data field signifies that the data field is applicable to interactions amongst the one or more interactions similar to the interaction event; and
        updating the implementation guide in a configuration database with the data field such that the data field is to be used in interpreting future documents specifying the interactions.

2. The computer implemented method of claim 1, the identifying comprising:
    determining that the document includes a partner amongst the one or more partner and that an implementation guide corresponding to the partner is not stored in the configuration database for interactions;
    generating the implementation guide for the partner based on average data field requirements of similar interactions; and
    storing the implementation guide in the configuration database.

3. The computer implemented method of claim 1, the identifying comprising:
    determining that the document includes a partner amongst the one or more partner and that an implementation guide corresponding to the partner is stored in the configuration database for interactions; and
    retrieving the implementation guide for the partner from the configuration database.

4. The computer implemented method of claim 1, further comprising:
    automatically generating, based on a latest implementation guide applicable to the document, an onboarding document for the interaction event corresponding to the document, wherein the onboarding document includes the one or more data field as interpreted by the latest implementation guide and each value of the one or more data field, and wherein a top-rank data field having the highest confidence level and a value corresponding to the top-rank data field from the document appear for each of the one or more data field in the onboarding document for the interaction event between the user and the partner; and
    presenting the onboarding document based on the latest implementation guide to the user via the user device to inform how the future documents in kind of the document to be interpreted.

5. The computer implemented method of claim 1, further comprising:
    automatically generating, based on a latest implementation guide applicable to the document, an onboarding document for the interaction event corresponding to the document, wherein the onboarding document includes the one or more data field as interpreted by the latest implementation guide and each value of the one or more data field, and wherein a preconfigured number of highest ranking data fields having respective highest confidence levels and respective values corresponding to the preconfigured number of highest ranking data fields from the document appear for each of the one or more data field in the onboarding document for the interaction event between the user and the partner; and presenting the onboarding document based on the latest implementation guide to the user via the user device to inform how the future documents in kind of the document to be interpreted.

6. The computer implemented method of claim 1, the ascertaining comprising:

determining that the confidence level associated with the rank of the data field is greater than or equal to a predefined threshold for the confidence level in the implementation guide in the configuration database.

7. The computer implemented method of claim 1, the ascertaining comprising:

determining that the confidence level associated with the rank of the data field is less than a predefined threshold for the confidence level in the implementation guide;

presenting, to the user via the user device, the interaction event including the data field with the rank less than a preconfigured threshold for validation; and obtaining a positive feedback from the user, the positive feedback validating that the data field to be included in the implementation guide in the configuration database.

8. A computer program product comprising:

a computer readable storage medium readable by one or more processor and storing instructions for execution by the one or more processor for performing a method for providing onboarding services for one or more user in an environment, comprising:

obtaining a document from a user via a user device, wherein the document specifies one or more interactions between the user and one or more partner, wherein the document includes one or more data field having a respective value;

identifying one or more implementation guide applicable to the document from the obtaining, wherein each of the one or more implementation guide (i) is respective to each of the one or more partner and (ii) is utilized for interpreting documents;

generating an interaction event from the document according to one of the one or more implementation guide corresponding to a partner amongst the one or more partner, wherein each value of the one or more data field in the document specifies an aspect of the interaction event between the user and the partner; and updating the one or more implementation guide responsive to optimizing the interaction event by use of cognitive analysis and reinforced machine learning, such that an updated implementation guide resulting from the updating is predicted to have a second level of accuracy for interpreting documents between the user and the partner that is greater than a first level of accuracy associated with a first implementation guide, the updating comprising:

determining, by use of a cognitive analysis tool, a rank for a data field in the one or more data field in the interaction event, wherein the rank indicates how probable the data field amongst all data fields in the interaction event would represent a feature of the interaction event;

associating, by use of the cognitive analysis tool, a confidence level to the determined rank for the data field;

ascertaining that the confidence level associated with the rank in combination with a user validation for the data field signifies that the data field is applicable to interactions amongst the one or more interactions similar to the interaction event; and updating the implementation guide in a configuration database with the data field such that the data field is to be used in interpreting future documents specifying the interactions.

9. The computer program product of claim 8, the identifying comprising:

determining that the document includes a partner amongst the one or more partner and that an implementation guide corresponding to the partner is not stored in the configuration database for interactions;

generating the implementation guide for the partner based on average data field requirements of similar interactions; and storing the implementation guide in the configuration database.

10. The computer program product of claim 8, the identifying comprising:

determining that the document includes a partner amongst the one or more partner and that an implementation guide corresponding to the partner is stored in the configuration database for interactions; and retrieving the implementation guide for the partner from the configuration database.

11. The computer program product of claim 8, further comprising:

automatically generating, based on a latest implementation guide applicable to the document, an onboarding document for the interaction event corresponding to the document, wherein the onboarding document includes the one or more data field as interpreted by the latest implementation guide and each value of the one or more data field, and wherein a top-rank data field having the highest confidence level and a value corresponding to the top-rank data field from the document appear for each of the one or more data field in the onboarding document for the interaction event between the user and the partner; and presenting the onboarding document based on the latest implementation guide to the user via the user device to inform how the future documents in kind of the document to be interpreted.

12. The computer program product of claim 8, further comprising:

automatically generating, based on a latest implementation guide applicable to the document, an onboarding document for the interaction event corresponding to the document, wherein the onboarding document includes the one or more data field as interpreted by the latest implementation guide and each value of the one or more data field, and wherein a preconfigured number of highest ranking data fields having respective highest confidence levels and respective values corresponding to the preconfigured number of highest ranking data fields from the document appear for each of the one or more data field in the onboarding document for the interaction event between the user and the partner; and presenting the onboarding document based on the latest implementation guide to the user via the user device to inform how the future documents in kind of the document to be interpreted.

13. The computer program product of claim 8, the ascertaining comprising:
   determining that the confidence level associated with the rank of the data field is greater than or equal to a predefined threshold for the confidence level in the implementation guide in the configuration database.

14. The computer program product of claim 8, the ascertaining comprising:
   determining that the confidence level associated with the rank of the data field is less than a predefined threshold for the confidence level in the implementation guide;
   presenting, to the user via the user device, the interaction event including the data field with the rank less than a preconfigured threshold for validation; and
   obtaining a positive feedback from the user, the positive feedback validating that the data field to be included in the implementation guide in the configuration database.

15. A system comprising:
   a memory;
   one or more processor in communication with memory; and
   program instructions executable by the one or more processor via the memory to perform a method for providing onboarding services for one or more user in an environment, comprising:
      obtaining a document from a user via a user device, wherein the document specifies one or more interactions between the user and one or more partner, wherein the document includes one or more data field having a respective value;
      identifying one or more implementation guide applicable to the document from the obtaining, wherein each of the one or more implementation guide (i) is respective to each of the one or more partner and (ii) is utilized for interpreting documents;
      generating an interaction event from the document according to one of the one or more implementation guide corresponding to a partner amongst the one or more partner, wherein each value of the one or more data field in the document specifies an aspect of the interaction event between the user and the partner; and
      updating the one or more implementation guide responsive to optimizing the interaction event by use of cognitive analysis and reinforced machine learning, such that an updated implementation guide resulting from the updating is predicted to have a second level of accuracy for interpreting documents between the user and the partner that is greater than a first level of accuracy associated with a first implementation guide, the updating comprising:
         determining, by use of a cognitive analysis tool, a rank for a data field in the one or more data field in the interaction event, wherein the rank indicates how probable the data field amongst all data fields in the interaction event would represent a feature of the interaction event;
         associating, by use of the cognitive analysis tool, a confidence level to the determined rank for the data field;
         ascertaining that the confidence level associated with the rank in combination with a user validation for the data field signifies that the data field is applicable to interactions amongst the one or more interactions similar to the interaction event; and
         updating the implementation guide in a configuration database with the data field such that the data field is to be used in interpreting future documents specifying the interactions.

16. The system of claim 15, the identifying comprising:
   determining that the document includes a partner amongst the one or more partner and that an implementation guide corresponding to the partner is not stored in the configuration database for interactions;
   generating the implementation guide for the partner based on average data field requirements of similar interactions; and
   storing the implementation guide in the configuration database.

17. The system of claim 15, the identifying comprising:
   determining that the document includes a partner amongst the one or more partner and that an implementation guide corresponding to the partner is stored in the configuration database for interactions; and
   retrieving the implementation guide for the partner from the configuration database.

18. The system of claim 15, further comprising:
   automatically generating, based on a latest implementation guide applicable to the document, an onboarding document for the interaction event corresponding to the document, wherein the onboarding document includes the one or more data field as interpreted by the latest implementation guide and each value of the one or more data field, and wherein a top-rank data field having the highest confidence level and a value corresponding to the top-rank data field from the document appear for each of the one or more data field in the onboarding document for the interaction event between the user and the partner; and
   presenting the onboarding document based on the latest implementation guide to the user via the user device to inform how the future documents in kind of the document to be interpreted.

19. The system of claim 15, further comprising:
   automatically generating, based on a latest implementation guide applicable to the document, an onboarding document for the interaction event corresponding to the document, wherein the onboarding document includes the one or more data field as interpreted by the latest implementation guide and each value of the one or more data field, and wherein a preconfigured number of highest ranking data fields having respective highest confidence levels and respective values corresponding to the preconfigured number of highest ranking data fields from the document appear for each of the one or more data field in the onboarding document for the interaction event between the user and the partner; and
   presenting the onboarding document based on the latest implementation guide to the user via the user device to inform how the future documents in kind of the document to be interpreted.

20. The system of claim 15, the ascertaining comprising:
   determining that the confidence level associated with the rank of the data field is greater than or equal to a predefined threshold for the confidence level in the implementation guide in the configuration database.

\* \* \* \* \*